(12) United States Patent
Vasylyev

(10) Patent No.: US 11,754,756 B2
(45) Date of Patent: Sep. 12, 2023

(54) ANGULAR SELECTIVE LIGHT CONTROL SHEETING AND METHOD OF MAKING THE SAME

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 351 days.

(21) Appl. No.: 17/086,207

(22) Filed: Oct. 30, 2020

(65) Prior Publication Data
US 2021/0048564 A1    Feb. 18, 2021

Related U.S. Application Data

(62) Division of application No. 14/922,137, filed on Oct. 24, 2015, now abandoned.

(60) Provisional application No. 62/072,283, filed on Oct. 29, 2014.

(51) Int. Cl.
*G02B 5/00* (2006.01)

(52) U.S. Cl.
CPC ........ *G02B 5/003* (2013.01); *G02B 2207/123* (2013.01)

(58) Field of Classification Search
CPC .. G02B 5/003; G02B 1/111; G02B 2207/123; G02B 27/0018; G02B 1/043; G02B 5/208; G02B 5/223; C08K 3/013; C08K 3/36; C08K 5/0041; C09D 163/00; C09D 5/006; C09D 7/67; C09D 7/68; C09D 4/06; G03F 7/0007; G03F 7/0275; G03F 7/032; G03F 7/033; G03F 7/105
See application file for complete search history.

(56) References Cited

U.S. PATENT DOCUMENTS

| | | | |
|---|---|---|---|
| 2,749,794 A | 6/1956 | Oleary | |
| 3,524,789 A | 8/1970 | Olsen | |
| 3,707,416 A | 12/1972 | Stevens | |
| 3,919,559 A | 11/1975 | Stevens | |
| 3,922,440 A | 11/1975 | Wegwerth et al. | |
| 4,553,818 A | 11/1985 | Cohen | |
| 4,621,898 A | 11/1986 | Cohen | |
| 4,766,023 A | 8/1988 | Lu | |
| 4,772,096 A | 9/1988 | Kai et al. | |
| 4,772,097 A | 9/1988 | Takeuchi et al. | |
| 4,877,308 A | 10/1989 | Okuno et al. | |
| 5,204,160 A | 4/1993 | Rouser | |
| 5,254,388 A | 10/1993 | Melby et al. | |
| 5,570,239 A | 10/1996 | Raimondi | |
| 6,239,911 B1 * | 5/2001 | Koike | H01J 29/89 264/2.7 |

(Continued)

FOREIGN PATENT DOCUMENTS

EP         0466460 A2    1/1992

*Primary Examiner* — Mustak Choudhury

(57) ABSTRACT

A method of making an angular selective light control sheeting is disclosed. The method includes providing a sheet of an optically transmissive elastic material, providing a slitting blade, advancing the slitting blade into the optically transmissive elastic material to a predetermined depth, moving the slitting blade relatively to the sheet along a straight or curvilinear path so as to form a channel in the elastic material, and introducing an opaque material into the channel.

20 Claims, 6 Drawing Sheets

(56) References Cited

U.S. PATENT DOCUMENTS

| | | | |
|---|---|---|---|
| 6,398,370 | B1 | 6/2002 | Chiu et al. |
| 6,473,220 | B1 | 10/2002 | Clikeman et al. |
| 7,467,873 | B2 | 12/2008 | Clarke et al. |
| 8,012,567 | B2 | 9/2011 | Gaides et al. |
| 3,057,715 | A1 | 11/2011 | Foley et al. |
| 9,051,776 | B2 | 6/2015 | Wessel |
| 2003/0156329 | A1 | 8/2003 | Wilkinson |
| 2007/0034343 | A1 | 2/2007 | Zahka |
| 2007/0037929 | A1* | 2/2007 | Joo ..................... C08L 27/06 525/191 |
| 2007/0087186 | A1 | 4/2007 | Clarke et al. |
| 2007/0160811 | A1* | 7/2007 | Gaides ................. G02B 5/003 428/173 |
| 2008/0144179 | A1* | 6/2008 | Mimura ............... G02B 5/0252 359/599 |
| 2009/0032390 | A1 | 2/2009 | Osterlund |
| 2010/0033827 | A1 | 2/2010 | Foley et al. |
| 2010/0201242 | A1 | 8/2010 | Liu et al. |
| 2010/0283947 | A1* | 11/2010 | Nishihara ........... G02B 17/006 349/112 |
| 2011/0088324 | A1 | 4/2011 | Wessel |
| 2012/0087011 | A1 | 4/2012 | Moon et al. |
| 2012/0154885 | A1* | 6/2012 | Jones .................. G02B 5/223 359/227 |
| 2012/0168070 | A1 | 7/2012 | Nelson et al. |
| 2014/0110040 | A1 | 4/2014 | Cok |
| 2014/0204464 | A1* | 7/2014 | Halverson ......... G02F 1/133524 359/599 |

\* cited by examiner

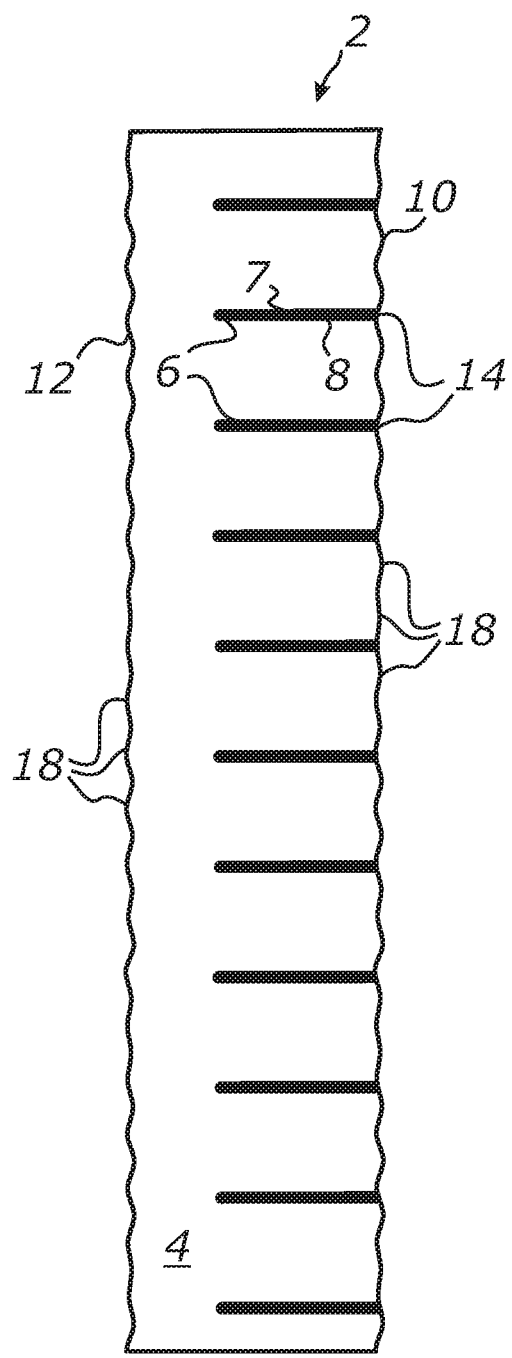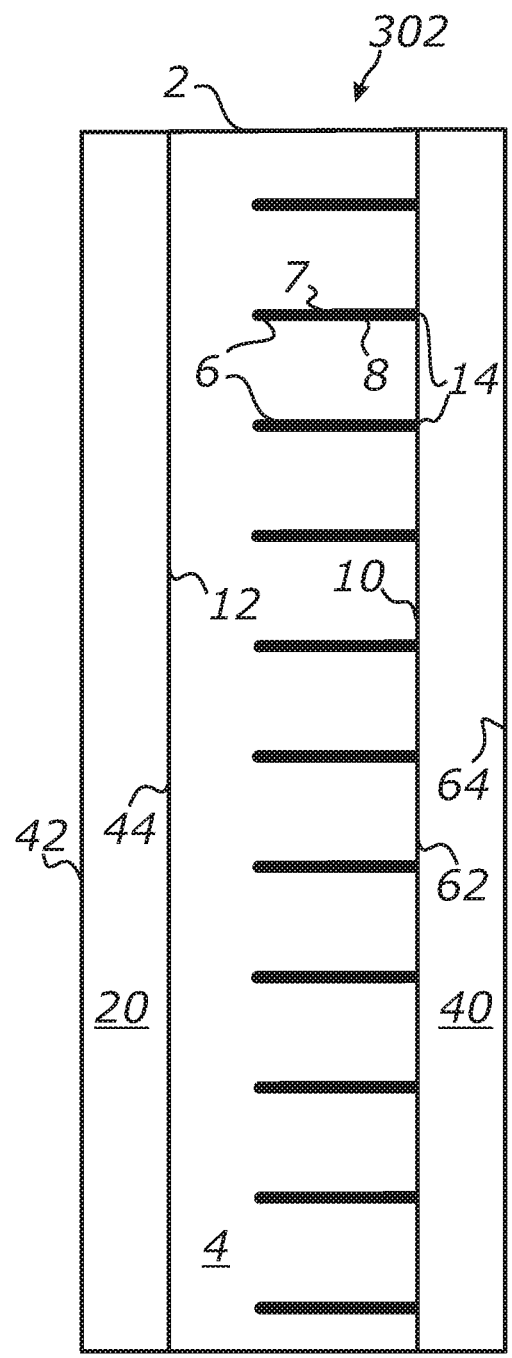
FIG. 7
FIG. 8

ANGULAR SELECTIVE LIGHT CONTROL SHEETING AND METHOD OF MAKING THE SAME

CROSS-REFERENCE TO RELATED APPLICATIONS

This application is a division of application Ser. No. 14/922,137, filed Oct. 24, 2015, which claims priority from U.S. Provisional Application No. 62/072,283, filed on Oct. 29, 2014, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to light control sheets, films and laminate structures that include micro-louvered structures to limit the range of light propagation angles. This invention is also related to a method of making such light control sheets, films and laminate structures.

2. Description of Background Art

Light control films with embedded micro-louver structures are widely used for limiting light transmission at high incidence angles while transmitting at least some light propagating at low incidence angles. The conventional light control films may exhibit certain disadvantages and can be relatively difficult and/or expensive to manufacture at an industrial scale.

One common method of making such louvered light control films is disclosed in U.S. Pat. No. Re. 27,617 (Olsen) which includes skiving a billet of alternating layers of plastic having relatively lower and relatively higher optical densities. Upon skiving the billet, the pigmented layers provide opaque micro-louver elements, resulting in a louvered plastic film.

Other methods of producing light control structured with louver-like features include forming surface grooves using molding, embossing, imprinting or etching with the subsequent introduction of an opaque material into the groves. For example, U.S. Pat. No. 4,621,898 (Cohen) discloses a directional filter formed from a transparent plate having a series of etched grooves extending into the plate from one side. The grooves have a light absorbing characteristic which causes them to absorb light impinging upon the grooves from within the plate. The grooves are created by etching the plate through a mask or using a special mold having appropriate knife edges along a surface of the plate.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

The present invention generally relates to controlling light propagation depending on the incidence angle within a thin sheet-form optically transmissive material having opaque micro-louver structures embedded into its body. It also relates to a structure and/or composition of such sheet-form material. It yet further relates to a method of making the opaque micro-louver structures in such material.

According to one embodiment, angular selective light control sheeting is formed from an optically transmissive elastic material that allows for its slitting using a sharp object such as a blade or razor. According to one embodiment, micro-louvers are produced by slitting a surface of the material using one or more blades and introducing an opaque material into the slits. In one embodiment, the material may be stretched to accommodate slitting and/or introducing the opaque material. Once the opaque material is introduced into the slits and optionally cured, the slits may be allowed to close upon themselves to form a monolithic structure. In one embodiment, the structural characteristics of the formed structure are enhanced by including an adhesive material into the opaque material or otherwise fusing the slits using heat or other suitable means.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 7 is a schematic cross section view of an angular selective light control sheet material, showing microstructures formed in opposing surfaces of the material, according to at least one embodiment of the present invention.

FIG. 8 is a schematic cross section view of a light control glazing panel including an angular selective sheet material, according to at least one embodiment of the present invention.

DETAILED DESCRIPTION OF THE INVENTION

Referring more specifically to the drawings, for illustrative purposes, the present invention is embodied in the apparatus and method generally shown in the preceding figures. It will be appreciated that the apparatus and method may vary as to configuration and as to details of the parts and/or steps without departing from the basic concepts as disclosed herein. Furthermore, elements represented in one embodiment as taught herein are applicable without limitation to other embodiments taught herein, and in combination with those embodiments and what is known in the art.

The present invention particularly seeks to provide angularly selective sheet-form light control materials capable of providing variable transmissivity depending on the angle of incidence and particularly providing high levels of opacity at high incidence angles (generally above about 40 degrees or so).

The following embodiments of the present invention are generally directed to a sheet-form optical article which is adapted to be operable in response to light incident onto its surface and which may be configurable for a generally unimpeded passage of light incident from a normal direction or low incidence angles while providing a progressively higher opacity levels as the incidence angle increases.

Figure 1:
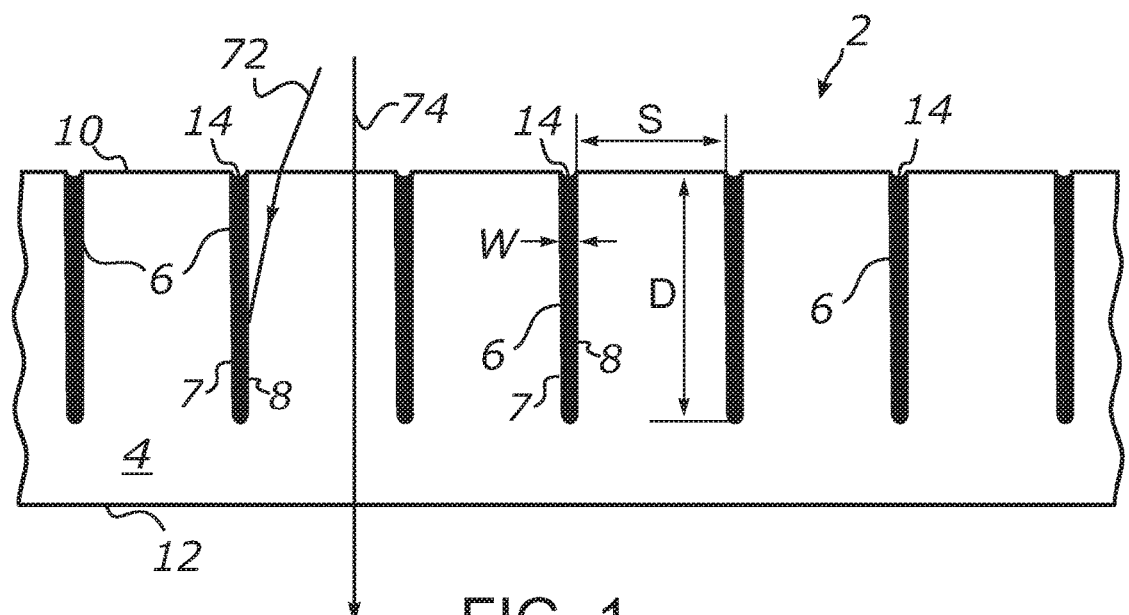
FIG. 1 is a schematic cross section view and raytracing of an angular selective light control sheet material, according to at least one embodiment of the present invention.

FIG. 1 illustrates a first embodiment of an angular selective light control sheeting of the invention. According to this embodiment, a light control sheet 2 has at least one layer 4 of an optically transmissive, solid material defined by opposing major surfaces 10 and 12 that extend parallel to each other.

The material of layer 4 should preferably be optically clear or at least translucent with relatively high light transmissivity so that sheet 2 can effectively transmit light that enters onto either one of surfaces 10 and 12 perpendicular to the surface of layer 4. The material selected for layer 4 may also have some tint or haze that do not significantly impair its light transmissive properties.

Layer 4 is made from a relatively soft and highly flexible plastic material shat should also preferably have good elasticity (rubber-like properties) The softness and elasticity of the material should be sufficient to permit slitting a surface of the material using a sharp object such as a razor or a blade without fracturing or tearing sheet 2 apart. According to one embodiment, layer 4 is made from an optically clear plasticized polyvinyl chloride (also frequently referred to as PVC-P, plasticized PVC, flexible PVC or simply vinyl). According to an alternative embodiment, layer 4 can be made from thermoplastic polyurethane (TPU). More broadly, suitable materials for layer 4 may include various Thermoplastic Elastomers (TPEs) that can be repeatedly stretched to a considerable relative elongation or alternatively compressed with an ability to return to their approximate original length when stress is released. Suitable materials for sheet 4 may further include but are not limited to various optically clear or translucent thermoplastic elastomers and silicone rubber.

The major broad-area surfaces 10 and 12 of layer 4 can have a smooth finish and may also be calendered for high gloss and optical transmissivity. Alternatively, either one or both major surfaces 10 and 12 can be provided with some surface roughness, for example, to diffuse light and/or promote adhesion of such surfaces to various substrates, if applicable. However, such roughness should normally be controlled so as to not significantly impair the transmissivity of sheet 2.

The thickness of layer 4 may be selected from the range of thicknesses that is typical to films or thin sheets of plastic materials. In a preferred embodiment, the thickness of layer 4 may be selected from the range between 50 micrometers and 2 millimeters.

Sheet 2 includes a parallel array of linear slits 6 formed in surface 10 of layer 4 and extending into the depth of the layer generally perpendicular to the surface. Such slits 6 can be formed by a sharp knife, razor or blade using any suitable slitting technique. According to one embodiment, slits 6 are formed by one or more rotary blades using reciprocal slitting motion along a surface of layer 4.

In the context of the present invention and from the practical standpoint, the term "slit" is directed to mean a straight and narrow partial cut in a surface of a material formed by a sharp object. It may be appreciated that, in contrast to other methods of surface structuring such as molding, embossing, imprinting or etching, slits may be produced generally without material removal or substantial flow of the material. It may further be appreciated that slitting generally does not require material melting and can be performed on a fully cured, solid material as long as the material is sufficiently soft and deformable by the blade used to produce the slits.

Each slit 6 has a pair of opposing walls 7 and 8 which are generally planar and extend substantially parallel to each other. The distance between walls 7 and 8 which defines a width W of slits 6 should be substantially less than a depth D of the slits. According to an embodiment of the present invention, the depth D of each slit 6 may be at least ten times the average width W of the slit (D/W ratio of 10 or more). By way of example and not limitation, the average width of slit 6 can be 20 micrometers or less and the depth of the slit can be about 200 micrometers or more. In at least some embodiments, the D/W ratio may be advantageously selected to exceed 20, 30, 40, 50 and even 100. In at least some embodiments, the width W of slits 6 can be less than 10 micrometers, less than 5 micrometers, less than 2 micrometers, and even less than 1 micrometer resulting in fairly high D/W ratios.

It may be appreciated that thinner slits should generally result in a better overall transmissivity of sheet 2 and reduced conspicuity of the slits, especially when such sheet is viewed along a surface normal. Particularly, in order to provide high optical transmittance and generally unimpeded transversal light passage through layer 4, width W of slits 6 should be sufficiently small compared to a width S of transparent spacing areas between the adjacent slits. According to one embodiment, it is preferred that the S/W ratio is greater than 5, more preferably at least 10, even more preferably at least 20, and still even more preferably 30 or more.

According to a preferred embodiment, the material of layer 4 has sufficient elasticity to allow forming slits 6 primarily in an elastic deformation mode. The elasticity of the material can play a significant role in the way slits 6 are formed. It is noted that using slits versus other types of surface microstructures allows for obtaining an arbitrary small width W since slits formed in a highly elastic material normally tend to close upon themselves to a zero or near-zero width due to the ability of the material to return to its original shape after slitting. On the other hand, the material of layer 4 can be slightly extended along a direction perpendicular to linear slits 6 causing said slits to open to a prescribed width W. By varying the elongation force applied to the material of layer 4, width W of slits 6 can thus be varied in a broad range.

Figure 2:
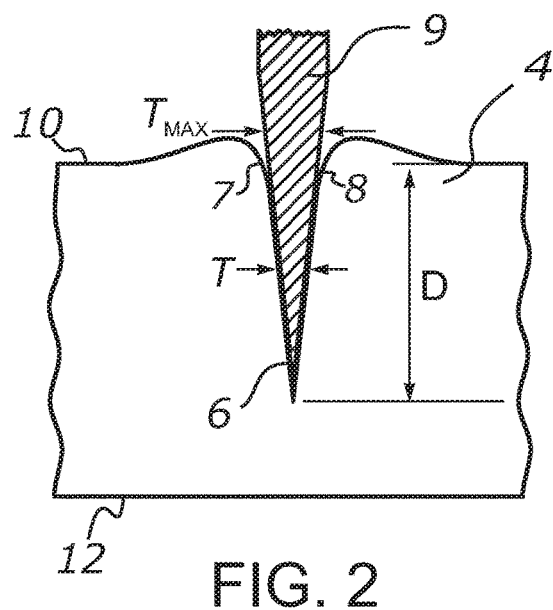
FIG. 2 is a schematic view illustrating a process of producing a slit in a layer of a soft and elastic material using a blade, according to at least one embodiment of the present invention.
Figure 3:
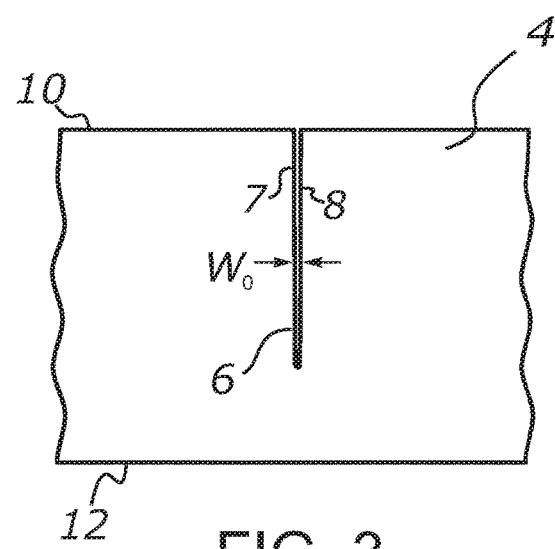
FIG. 3 is a schematic view showing a narrow slit formed in a layer of a soft and elastic material using a blade, according to at least one embodiment of the present invention.

The formation of an individual slit 6 in a soft and highly elastic material of layer 4 using a sharp blade is illustrated in FIG. 2 and FIG. 3.

Referring to FIG. 2, a blade 9 is engaged into surface 10 of layer 4 to depth D and moved along the prescribed slitting direction to produce linear slit 6. Blade 9 should preferably have a narrow and knife-sharp tip. A taper angle of the cutting tip should preferably be less than 30°, more preferably less than 25°, even more preferably less than 20°, and still even more preferably less or equal to 17°.

The cutting tip of fully-engaged blade 9 may be characterized by an average thickness T and a maximum thickness $T_{MAX}$ which can be measured, for example, at a mid-point of depth D and at the entrance area of blade 9 into the material of layer 4, respectively. Maximum thickness $T_{MAX}$ of the material-cutting tip of blade 9 should preferably be less than 300 μm, more preferably less than 200 μm, even more preferably less than 150 μm, and still even more preferably less than 100 μm.

As blade 9 is moved across surface 10, the soft and elastic material of layer 4 yields under the pressure of the blade and allows for forming a deep cut without material fracturing or substantial viscous flow. As a result of blade 9 forcing the material of layer 4 to the sides along the slitting path, the material of layer 4 may compress, elongate and/or bulge out at surface 10 to accommodate the thickness of the cutting tip. It is noted, however, that such deformations should primarily occur in an elastic deformation mode. A small amount of plastic deformation may be allowed during slitting. However, such plastic deformation should preferably be considerably less than the elastic deformation.

While many ductile materials exhibit at least some form of elasticity at small deformations, it is generally preferred that the material selected for layer 4 has a relative high elastic range compared to the common optical plastic materials such as rigid PVC, PMMA (acrylic), polycarbonate, polystyrene, and the like.

Elastic range can be defined as the maximum deformation (or strain) at which a material reaches its yield strength (or the so-called proportional limit). In other words, the elastic range represents the maximum deformation (e.g., elongation along a length direction) of the material at which the material is still capable to return to its approximate original dimensions using its elastic properties after the stress is removed. The elastic range can be expressed in terms of a relative elongation of the material with respect to its original length. The term "elastic range" is also related to such terms as "yield strain" and "elongation at yield" which define the elongation corresponding to the yield (where an increase in strain does not result in an increase in stress) and are also commonly expressed in a percentage of the original length.

The elasticity of the material of layer 4 should be sufficient to accommodate the full thickness $T_{max}$ of the cutting tip of blade 9 without material rupture and without substantial viscous flow. According to one embodiment, either one of the above-discussed elasticity parameters (elastic range, yield stress and/or elongation at yield) of the material of sheet 4 is at least 10%, more preferably at least 30%, even more preferably at least 50%, and can even be greater than 100%.

It is preferred that the material of sheet 2 is sufficiently soft to allow for deep penetration of blade 9 without blade breakage or premature dulling of the cutting tip. The hardness typical to most grades of TPU or plasticized PVC at room temperatures can be deemed appropriate for the formation of slits 6. More generally, the material of layer 4 should preferably have hardness that is below a durometer hardness value of 95 Shore A (as measured in accordance with the American Society for Testing and Materials standard ASTM D2240 type A scale) at the time of slitting or at least does not significantly exceed such value. If the plastic material is not sufficiently soft at room temperature, it should be heated and softened before the slitting process begins.

On the other hand, it may be preferred that the material is not excessively soft to allow its further processing by methods described below. In one embodiment, the material of layer 4 should preferably have a durometer hardness above 70 Shore A during processing and/or normal use.

In some applications, it may be advantageous to select the material for layer 4 that would provide relatively low resistance to blade 9 and allow for reasonably high processing speeds with a low rate of blade wear. Accordingly, it is generally preferred that the elastic modulus of the material of layer 4 is less than 70 MPa.

FIG. 3 shows slit 6 after blade 9 is removed from the material of layer 4. Due to the elasticity of the layer 4 material, walls 7 and 8 converge to a relatively small distance that can characterize a minimum width $W_0$ of the respective slit 6. Depending on the elasticity of the material of layer 4, thickness of blade 9 and slitting regimes, the minimum width $W_0$ can be a zero, corresponding to a case when walls 7 and 8 come into contact with each other, or can take relatively small values compared to thickness of blade 9.

Non-zero widths $W_0$ may correspond to the cases when a relatively small portion of the material deformation during slitting (FIG. 2) occurred in a plastic deformation mode.

According to one embodiment, $W_0$ is at least 5 times less than $T_{MAX}$, more preferably at least 10 times less than $T_{MAX}$, even more preferably at least 15 times less than $T_{MAX}$, and still even more preferably at least 20 times less than $T_{MAX}$ for a generally unloaded (fully relaxed) material of layer 4. It is however noted that, by applying sufficient external forces, the material can be stretched to a considerable extent, resulting in widening of the slit 9 to widths W greater than $W_0$.

Even though width W of slits 9 can be made fairly large by stretching the material along a direction perpendicular to the slits' longitudinal axis, it should conventionally be limited to relatively small values so as to minimize light interception at normal incidence. It is also generally preferred that width W is considerably less than blade thickness $T_{max}$. According to one embodiment, W is less than $T_{max}$ by at least 2 times, more preferably by at least 3 times and even more preferably by at least 5 times. Again, it is noted that such low width W of slits 6 compared to the thickness of blade 9 (or its cutting tip) can be made possible due to the elasticity of layer 4 material and its ability to recover after non-negligible deformations associated with material slitting.

By way of example, a parallel array of slits 6 may be produced by slitting surface 10 by one or more a rotary blades using a technique described in U.S. Pat. No. 8,824,050 by the same inventor (published Sep. 2, 2014), herein incorporated by reference in its entirety. It is noted that, where a definition or use of a term in a reference, which is incorporated by reference herein is inconsistent or contrary to the definition of that term provided herein, the definition of that term provided herein applies and the definition of that term in the reference does not apply.

In one embodiment, walls 7 and 8 can be made smooth and glossy which may be accomplished by providing a highly polished cutting tip of blade 9 used to produce the respective slit 6. In an alternative embodiment, such walls may also have relatively rough surfaces produced by relatively rough walls and/or cutting tip of blade 9.

Referring back to FIG. 1, the interior of each slit 6 is filled with an opaque material so as to form an opaque layer 14 between walls 7 and 8. Such individual slit 6 with the opaque layer 14 may thus form an individual micro-louver which can block at least a portion of light propagating through sheet 2 at off-normal angles.

The opaque material may include various pigments, inks, dyes or other materials characterized by high opacity or the so-called hiding power. According to one embodiment, the opaque material may comprise carbon black which is a very common material used to produce black pigments and colorants. Other suitable materials also include iron black, aniline black, molybdate orange and cyanide blue.

An alternative to the black or dark-colored materials may be white, gray or light-colored materials which still prevent light from passing through layer 14 by scattering visible light. A yet further alternative may be certain transparent or translucent materials in the form of particles, granules or fibers which scatter or otherwise redistribute light and prevent or substantially disturb light propagation through layer 14.

It may be appreciated that certain high-refractive-index materials can also provide sufficiently high hiding power or opacity at relatively low layer thicknesses by means of random light scattering at high bend angles. Accordingly, such materials may also be used for forming layer 14 and may include but are not limited to titanium oxide, zinc sulphide, antimony oxide, silica, calcium carbonate and zinc oxide. In a yet other alternative, metal powders may also be used for forming layer 14. In one embodiment, the opaque material of layer 14 may include a surface etchant so that the ink could be etched into the surface of slits 6.

Suitable opaque materials may be introduced into slits 6 in various forms, including but not limited to powder, solid, aerosol, liquid, gel, mixture, suspension, solution, and dispersion. The appropriate opaque materials or pigments may also be mixed with binders, solvents, polymers and any other suitable additives, which, when introduced into slits 6, may be cured or dried, yielding a thin film between walls 7 and 8 or otherwise forming opaque layers directly on such walls.

Certain liquid-form opaque materials may be introduced into the interior of slits 6 using capillary action. Alternatively, liquid opaque materials may also be introduced or forced into slits 6 by gravity flow or by applying pressure or vacuum. For example, layer 4 can be sandwiched between opposing air-tight surfaces and the interiors of slits 6 can be impregnated with an opaque liquid material by forcing such opaque liquid into slits under pressure or using vacuum suction.

According to one embodiment, the deep and narrow channels formed by slits 6 may be reversibly filled with a liquid opaque material to make angularly selective light control film with switchable action. In such embodiment, the liquid opaque material can be repeatedly introduced and pulled out from slits 6 in response to a control command from a user or automatic lighting control system thus switching sheet 2 to an opaque or transmissive state on demand.

The opaque material introduced into slits 6 may also be selected from various active materials that change their opacity or color in response to environmental conditions (such as, for example, temperature, humidity or lighting levels) or in response to the applied voltage or electric field. In one embodiment, opaque layer 14 may comprise an electrochromic material that reversibly changes its opacity or color in response the presence or variability of an electric field. Active layer 14 may also include liquid crystals, suspended particles or reflective hybrids.

In operation, referring further to FIG. 1, a light ray 72 exemplifying off-normal light striking surface 10 of layer 4 is intercepted and absorbed by one of the opaque layers 14 within the respective slit 6. In contrast, a normal-incidence ray 74 propagates freely thought layer 4 and exits from surface 12 without any change in propagation direction.

It may be appreciated that the relative amount of transmitted and absorbed light will vary depending on the incidence angle of light onto a surface of layer 4 and may further be controlled by the ratio between slit depth D and spacing width S. Accordingly, the micro-louvered sheet-form structure of FIG. 1 can provide angular selective attenuation of light. Furthermore, when layer 4 includes an electro-photo-active material (e.g., electrochromic), the attenuation of off-axis light can be additionally controlled by switching the respective active materials on and off.

An embodiment of a method of making the structure of FIG. 1 is illustrated in FIG. 4a-e.

Referring to FIG. 4a, a rotary blade 9 is used to slit surface 10 of layer 4 and to form a plurality of parallel linear slits 6 that extend deep into the material of the layer. The softness and/or elasticity of sheet 2 may be important for this step. If the material of layer 4 is insufficiently soft at room temperature for efficient slitting, it can be temporarily softened by heating or by other means in order to enhance blade 9 penetration into the material and reduce blade wear.

Blade 9 should be sufficiently sharp and made from a hard material. The penetration depth of blade 9 into layer 4 is primarily defined by the desired depth of slits 6 to be formed in such layer. According to one embodiment, the slitting depth should be greater than 25% of the thickness of the sheet material, and more preferably, greater than 50%. The slitting process is repeated until slits 6 cover all of the designated area of surface 10 (FIG. 4*b*).

Referring to FIG. 4*c*, sheet 2 is stretched along directions 582 and 584 which are generally perpendicular to linear slits 6. The elongation of sheet 2 in response to such stretching results in the separation of walls 7 and 8 of each slit 6 thus forming well-defined, expanded channels. It is preferred that such elongation occurs primarily in an elastic deformation mode, although some minimal stretching of the material in the areas of slits 6 in a plastic deformation mode may also be allowed.

It will be appreciated that, since the effective thickness of the material in the areas below each 6 slit is considerably smaller than the total thickness of layer 4, the elongation will generally be greater in such areas compared to the adjacent "full thickness" areas. Accordingly, such disproportional elongation of sheet 2 along directions 582 and 584 will favor forming the channels with separated walls 7 and 8 and will require applying considerably lower stress compared to the case of stretching sheet 2 when it is intact (i.e., before slitting).

Referring to FIG. 4*d*, an opaque (preferably black) ink is introduced into the channels formed from slits 6 while sheet 2 remains elongated compared to its original dimensions. This can be done, for example, by temporarily coating surface 10 with a thin layer 33 of an opaque ink using a wire rod, spraying or a any other suitable coating technique and allowing the ink to penetrate into slits 6. Alternatively, sheet 2 may be immersed into an ink solution causing the ink to fill the interiors of slits 6 due to capillary action and/or gravity. It may be advantageous to keep the width of the channels sufficiently high for this step in order to facilitate ink penetration and help eject air from the channels.

Subsequently, the pull force along directions 582 and 584 is at least partially released so that slits 6 are at least partially closed upon themselves and the excess material is squeezed out by the elastic forces of the material. As it was discussed above, the controlled stretching of sheet 2 allows for making extremely thin micro-louvers due to the elasticity of the material which tries to revert the sheet into its original dimensions and completely close the slits. Yet, at least some minimum residual thickness of the micro-louvers may need to be provided based on the opacity or hiding power of the opaque material. Accordingly, some residual stretching force can be maintained at this step to allow for a sufficient amount of the opaque material to remain in the slits and to maintain a prescribed thickness of the embedded micro-louvers.

Once slits 6 have been filled with an opaque ink, the excess ink can now be removed from surface 10. This process step can be done, for example, by wiping the ink off the surface using a squeegee or by washing it away. Subsequently, the ink remaining in slits 6 may be allowed to cure or dry out, after which the stress forces applied to sheet 2 along directions 582 and 584 may be completely released resulting in a finished layer 4 having embedded layers 14 of an opaque material that form light-filtering micro-louvers (FIG. 4*e*).

Heating can be applied to sheet 2 to anneal the material of layer 4 and relieve any residual stresses that may remain in the material after its elongation in an elastic deformation mode. According to one embodiment, sheet 2 can be annealed at a temperature of at least 50° C., more preferably above 60° C. and even more preferably above 70° C.

The opaque ink may be provided with a binding agent or adhesive properties so as to bond walls 7 and 8 together and to result in a monolithic structure of layer 4. Alternatively, slits 6 may be fused by applying heat to layer 4. Techniques employing heated rolls or plates, radiant heat, ultrasonic welding or radio-frequency (RF) welding may be used for this purpose.

Heating may be advantageously used to further soften the material of layer 4 and to optionally cause the material to viscously flow and permanently encapsulate slits 6 with opaque layers 14. The heat can also be used to promote diffusion of the opaque ink into the material of layer 4. According to various embodiments and depending on the type of material used for layer 4, sheet 2 can be heated to temperatures above 80° C., above 100° C. and above 120° C.

In one embodiment, blade 9 may be configured to produce slits 6 with a predetermined surface roughness or waviness which may also result in matte surface finish of walls 7 and 8. In such a case, the surface relief features alone may be sufficient to hold enough opaque material and produce opaque micro-louvers even if the slits 6 are allowed to close down to an effectively zero-width. The provided roughness of the surfaces of walls 7 and 8 may also advantageously contribute to the hiding power of the formed micro-louvers. In one embodiment, walls 7 and 8 are configured to have surface roughness which is sufficient for light scattering and notable blurring of images when viewed though slits 6.

Figure 4:
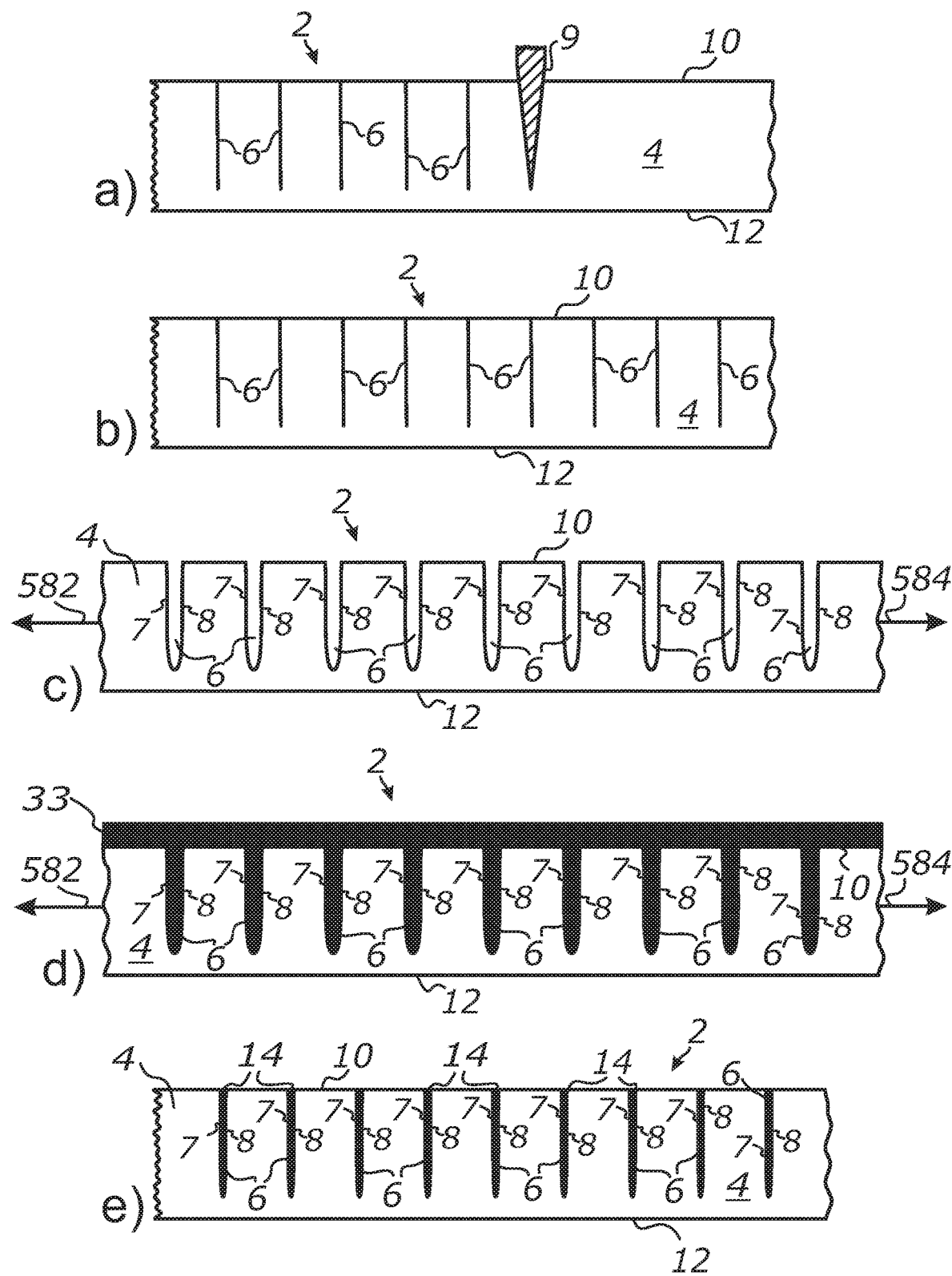
FIG. 4 is a schematic view illustrating a method of making an angular selective light control sheet material, showing steps of slitting a sheet of an elastic material using a blade or razor, stretching the sheet in a direction perpendicular to the formed slits, and introducing an opaque material into the slits, according to at least one embodiment of the present invention.

In a variation of the method depicted in FIG. 4, surface 10 of layer 4 may be masked with a sacrificial layer or a thin film of a plastic material prior to slitting. In this case, the ink may be allowed to completely or partially cure first and the unwanted ink can be subsequently removed from surface 10 by peeling off the sacrificial layer. In a further variation of the method, surface 10 of layer 4 may be coated with a release agent to prevent forming a bond to layer 33 and facilitate its removal from the surface.

Following the steps shown in FIG. 4, layer 4 can be laminated onto other substrates which may include light permeable sheets, panels or films. Suitable substrates may include but are not limited to glass, acrylic, polycarbonate, polyester, polystyrene and rigid PVC. Techniques like cold or hot roll lamination, press lamination, vacuum press lamination, encapsulation and the like may be used. A layer of a suitable optically clear adhesive can be provided between layer 4 and the respective substrate. Alternatively, layer 4 can be heat-bonded to the substrate or attached to a smooth surface of the substrate by means of the so-called static cling mechanism.

Furthermore, sheet 2 may further be processed to provide a desired surface finish. In one example, it may be calendered for a high gloss of either one or both surfaces 10 and 12. In another example, sheet 2 may be textured for added anti-glare protection of for light diffusion. In a yet further example, sheet 2 may be fused or bonded to a mesh or light permeable fabric.

The finished angular selective sheet 2 may be used in a number of ways. For example, it may be processed into a self-adhesive film laminate and applied to a window of a building façade. In such example, the resulting laminate can block or significantly attenuate high-elevation sunlight and provide a variable window tint effect depending on the viewing angle. When applied to POP displays or LCD screens, such angularly selective sheet could control the viewing angle of images behind the sheet and could also reduce the reflection glare.

It should be understood that the above-described sequence of steps in a method of making sheet 2 is not prescriptive and may be modified on case by case basis. For example, in one embodiment, sheet 2 may be pre-stretched and/or pre-heated prior to slitting. In this case, the slitting process may be performed with less material resistance and result in a longer useful life of blade 9. This may be particularly important in an embodiment of the method where a dense pack of multiple blades is used to make a series of simultaneous parallel cuts (see. e.g., FIG. 17-18 in U.S. Pat. No. 8,824,050 referenced above).

If the material of sheet 2 has a glass transition temperature $T_g$, the working temperature for the slitting process should be generally greater than $T_g$. At least some optically clear plastic materials, such as TPU or highly-plasticized PVC, often have $T_g$ which is significantly lower than the room temperature and may allow for proper slitting of sheet 2 without additional heating. However, even in this case, heating of sheet 2 to above the room temperature may still be useful. For instance, such pre-heating could help minimize the wear of blade 9, reduce its friction with the materials being slit, enhance the elastic response of sheet 2 material or otherwise enhance the quality of the slits. In a non-limiting example, when sheet 2 is made from a material having $T_g$ of around 5° C., the working temperature may be set to 30° C. or more.

It will be appreciated that, as the temperature gradually increases and reaches a certain level, at least some polymeric materials would lose their stiffness and become soft and elastic like a rubber. Considering that it may allow for stretching a material in the elastic mode and slitting it using a blade or razor, the method illustrated in FIG. 4 may be extended to include processing of plastic materials that are rigid or semi-rigid at room temperature but would become soft and elastic at elevated temperatures. By heating such materials during the steps of slitting and/or elongation of sheet 6 in the elastic or plastic-elastic mode, suitable arrays of parallel slits 6 may be produced. Accordingly, layer 4 including slits 6 filled with an opaque material may be formed from such rigid or semi-rigid materials without departing from the general scope of this invention.

In one embodiment, multiple micro-louver arrays may be produced by forming slits 6 at different angles with respect to each other. In one embodiment, layer 4 may comprise a first parallel array of slits 6 and a second parallel array of slits 6 crossed at a right angle with respect to the first parallel array, thus creating a rectangular grid of slits 6. By filling such crossing arrays of slits 6 with an opaque material, a rectangular grid of opaque embedded micro-louvers can thus be obtained.

Figure 5:
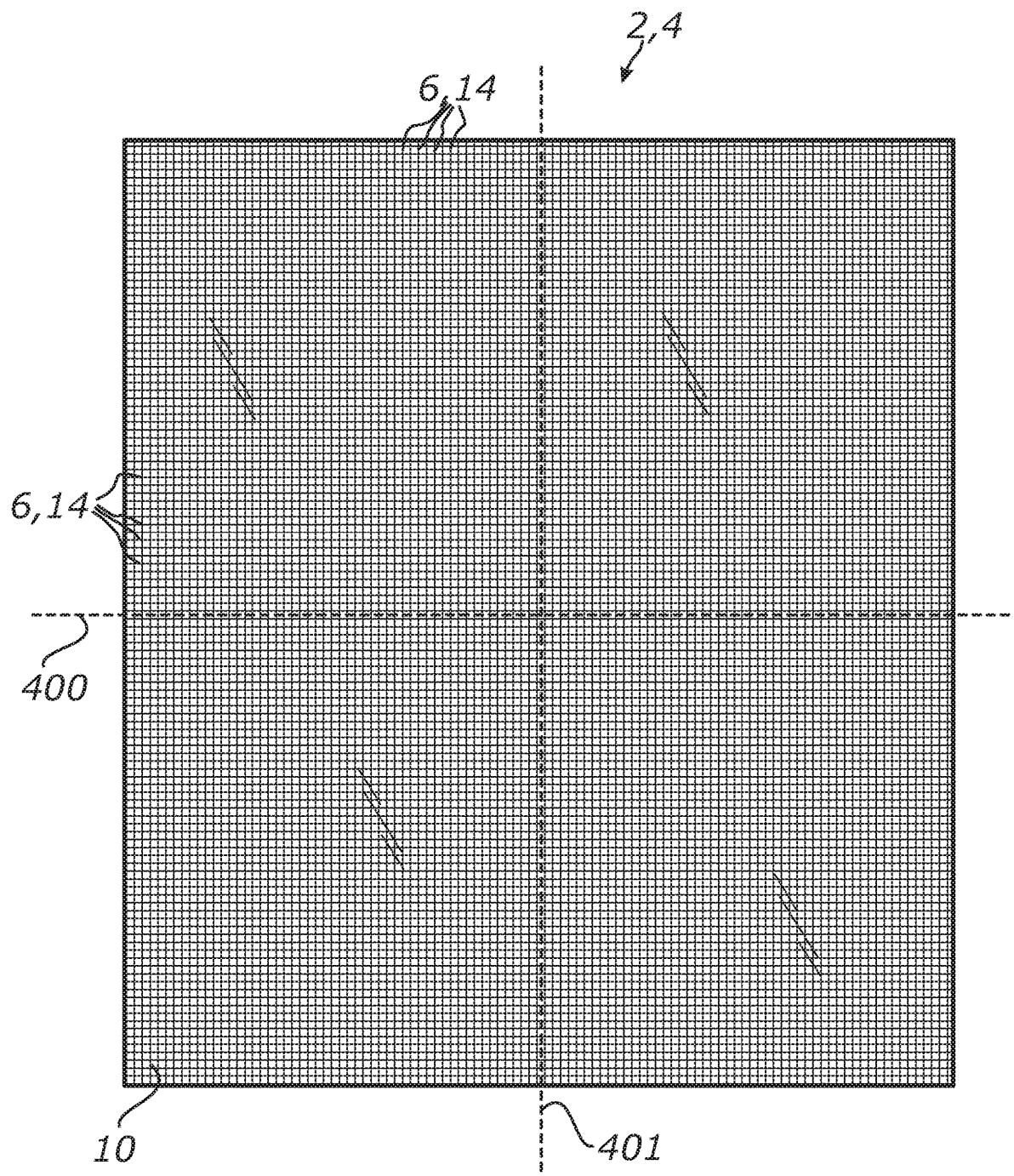
FIG. 5 is a schematic top view of an angular selective light control sheet, showing two linear arrays of parallel microlouvers crossed at a right angle with respect to each other, according to at least one embodiment of the present invention.

This is illustrated in FIG. 5 where a first array of opaque layers 14 extends parallel to a reference line 400 and a second array of opaque layers 14 extends parallel to a perpendicular reference line 401. Such configuration of sheet 2 with two perpendicular arrays of opaque micro-louvers may be used for filtering off-axis light rays in two orthogonal directions while providing transparency along a normal viewing direction.

Such perpendicular arrays of opaque layers 14 may be formed in the same surface of layer 4 (either surface 10 or 12). Alternatively one array of opaque layers 14 can be formed in surface 10 and a perpendicular array of opaque layers 14 can be formed in the opposing surface 12. In a further alternative, layer 4 can be formed by two or more sub-layers superimposed on one another and the respective arrays of opaque layers 14 may be formed in those different sub-layers.

Figure 6:
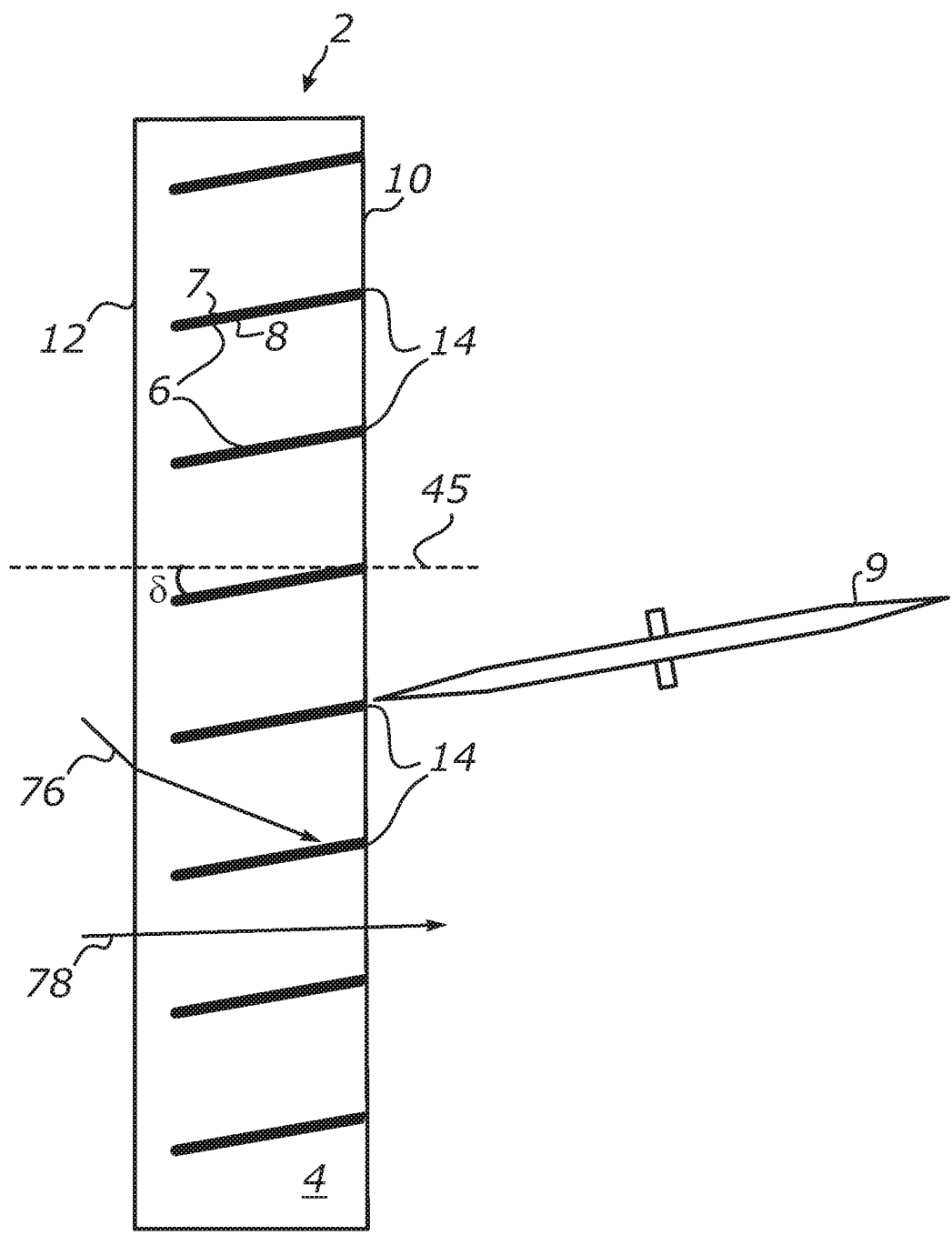
FIG. 6 is a schematic cross section view and raytracing of an angular selective light control sheet material, showing opaque layers formed in an optically transmissive material at an angle with respect to a surface normal of the material, according to at least one embodiment of the present invention.

According to one embodiment, slits 6 may be formed at different angles with respect to a surface or a surface normal of layer 4. FIG. 6 shows slits 6 that are formed at an angle δ with respect to normal 45. This can be accomplished, for example, by slitting surface 10 using blade 9 which is inclined at angle δ to such surface normal 45.

In operation, a light ray 76 exemplifying off-normal incident light strikes one of the opaque layers 14 and is absorbed. A normal-incidence ray 78 is transmitted as it passes through the space between adjacent opaque layers 14. Obviously, the angular dependence of light transmission of sheet 2 depicted in FIG. 6 will be different from the embodiment of FIG. 1. Accordingly, various angles δ and/or various orientations of sheet 2 with respect to the incident light can be selected for different applications and the desired angularly selective behavior of the sheet.

The distance between layers 14 can also be varied in a broad range across the surface of layer 4. This can be useful, for example, for providing different angular selective operation for different portions of sheet 2.

The appearance of sheet 2 may be configured in a number of ways. For instance, a pigment may be added to its material thus altering its overall color or transparency. Such color filtering material can be configured to provide a uniform tint or color to sheet 2. In one embodiment, one or more layers of sheet 2 may be tinted or configured for suitable light filtering properties, such as blocking the infra-red or ultra-violet rays, etc.

In one embodiment, the optical clarity of sheet 2 may be reduced compared to a perfectly clear appearance so that objects behind the sheet can be masked and/or blurred for a viewer. Also, any suitable image or pattern may be printed on either surface of sheet 2 for decorative purposes. The print may be opaque or transparent/semitransparent. Suitable printing techniques may include but are not limited to digital printing, screen printing, stencil-printing, selective dyeing and painting.

FIG. 7 shows an embodiment of angular selective light control sheet 2 in which surfaces 10 and 12 of layer 4 are provided with random surface relief features or surface microstructures 18. Such surface microstructures 18 can be formed by any known technique, including but not limited to surface embossing, imprinting, etching, and the like.

Surface microstructures 18 can play different roles. In one embodiment, such microstructures are configured to scatter light propagating through layer 4. In one embodiment, the microstructures are configured to promote adhesion of surfaces 10 and/or 12 to other surfaces. In one embodiment, microstructures 18 are configured to provide air escape paths during vacuum lamination of layer 4 into other optical structures designed to transmit light. Examples of such optical structures include but are not limited to glazing of building facades, laminated architectural glass, front glass of LCD display panels, and various illuminated or non-illuminated signage.

FIG. 8 shows an embodiment of a laminated light control panel 302 which includes sheet 2 as a core layer laminated between transparent sheets 20 and 40. Sheet 20 is defined by opposing broad-area surfaces 42 and 44 and sheet 40 is defined by opposing broad-area surfaces 62 and 64.

Sheets 20 and 40 can be made from rigid transparent materials such as glass, acrylic, polycarbonate or the like. Suitable lamination techniques may include vacuum press lamination. The vacuum press lamination process may also include autoclaving of the laminated sandwich at elevated temperatures in order to cause the material of sheet 2 to flow and permanently bond sheets 20 and 40 together.

Surfaces 42, 44, 62 and 64 of sheets 20 and 40, respectively, can be made smooth with high polish. Accordingly, when sheets 20, 2, and 40 are laminated into a single sandwich panel and autoclaved, the resulting panel can have a high transparency even when sheet 2 was initially somewhat imperfect or had relatively rough surfaces before lamination.

Figure 9:
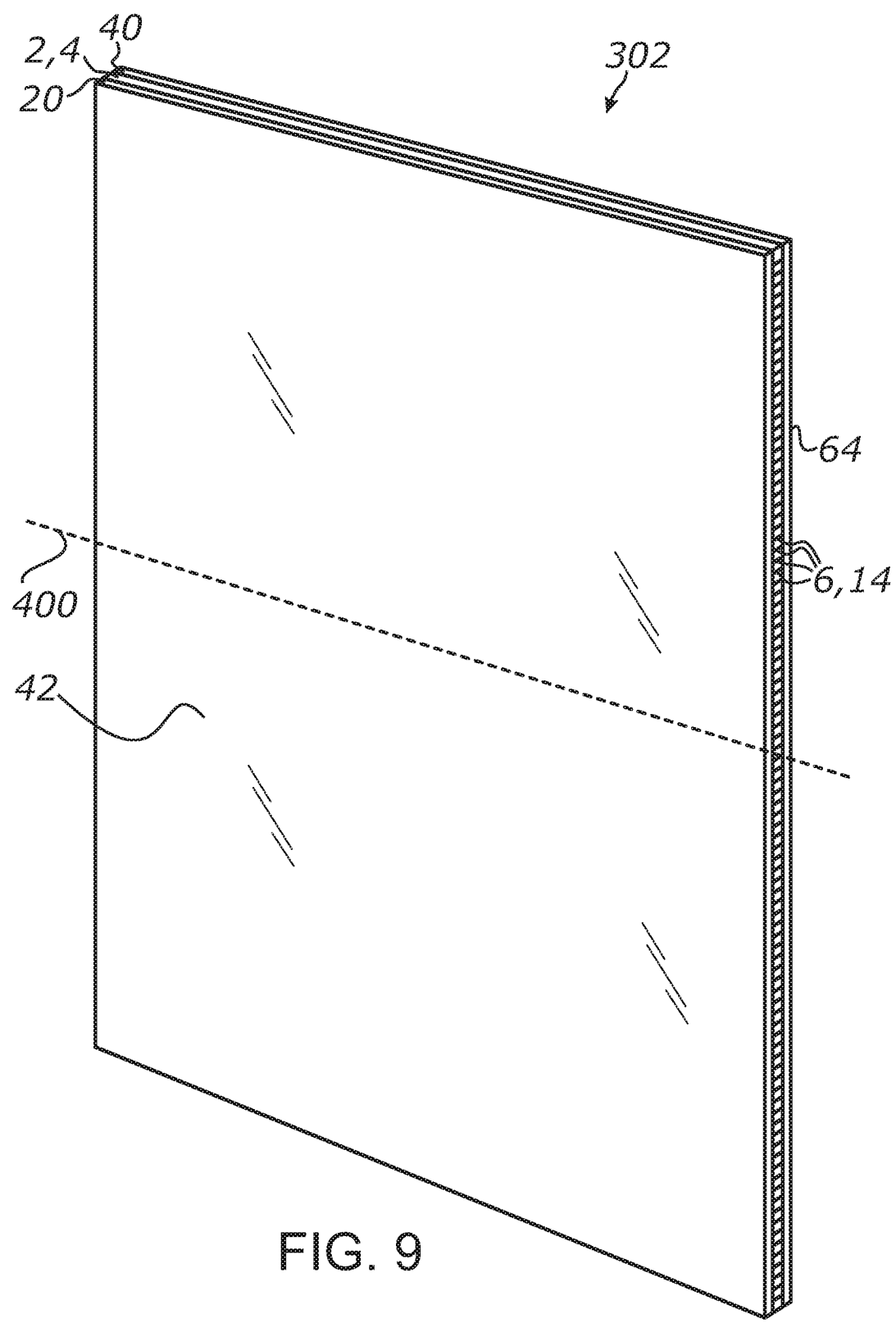
FIG. 9 is a schematic perspective view of a light control glazing panel including an angular selective sheet material, according to at least one embodiment of the present invention.

Light control panel 302 can have a generally planar shape, as illustrated in FIG. 9. It may exemplify laminated architectural glass panels that can be used for glazing building facades. It may be appreciated that, when such laminated glass panels are incorporated into wall windows, the windows will provide angularly selective operation and exhibit variable tint depending on the viewing angle.

Further details of the structure and operation of the angular selective light control sheeting of the invention and the method for making the same, as shown in the drawing figures, as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of making an angular selective light control sheet material, comprising:
   providing a sheet of an optically transmissive and highly elastic material;
   providing a slitting blade;
   advancing the slitting blade into the optically transmissive and highly elastic material to a predetermined depth;
   moving the slitting blade relatively to the sheet of an optically transmissive and highly elastic material along a straight path which is parallel to a major surface of the sheet of an optically transmissive and highly elastic material so as to form a first channel having a predetermined width; and
   introducing an opaque material into the first channel.

2. A method of making an angular selective light control sheet material as recited in claim 1, further comprising removing the slitting blade from the optically transmissive elastic material, moving the slitting blade relatively to the sheet of an optically transmissive elastic material along a direction which perpendicular to the first channel, advancing the slitting blade into the optically transmissive elastic material to the predetermined depth, moving the slitting blade relatively to the sheet of an optically transmissive elastic material along a straight path so as to form a second channel which is parallel to the first channel, and introducing the opaque material into the second channel.

3. A method of making an angular selective light control sheet material as recited in claim 1, further comprising heating at least a portion of the sheet of an optically transmissive elastic material to a temperature which is above a glass transition temperature of the optically transmissive elastic material.

4. A method of making an angular selective light control sheet material as recited in claim 1, wherein the slitting blade is advanced into the optically transmissive elastic material with respect to a surface of the sheet.

5. A method of making an angular selective light control sheet material as recited in claim 1, further comprising annealing the optically transmissive elastic material at a temperature of at least 50° C.

6. A method of making an angular selective light control sheet material as recited in claim 1, further comprising laminating a light permeable substrate to a surface of the sheet of an optically transmissive elastic material in which the first channel is formed.

7. A method of making an angular selective light control sheet material as recited in claim 1, further comprising attaching an light diffusing sheet to a surface of the sheet of an optically transmissive elastic material.

8. A method of making an angular selective light control sheet material as recited in claim 1, further comprising covering the first channel with a layer of an optically transmissive material.

9. A method of making an angular selective light control sheet material as recited in claim 1, further comprising elongating the sheet of an optically transmissive elastic material in a direction perpendicular to the first channel.

10. A method of making an angular selective light control sheet material as recited in claim 1, wherein the slitting blade is of a rotary type.

11. A method of making an angular selective light control sheet material as recited in claim 1, wherein the optically transmissive elastic material comprises plasticized polyvinyl chloride and has an elongation at yield of at least 10%.

12. A method of making an angular selective light control sheet material as recited in claim 1, wherein an elongation at yield of said optically transmissive elastic material is at least 30%.

13. A method of making an angular selective light control sheet material as recited in claim 1, wherein an elastic modulus of said optically transmissive elastic material is less than 70 MPa.

14. A method of making an angular selective light control sheet material as recited in claim 1, wherein said optically transmissive elastic material has a durometer hardness between 70 Shore A and 95 Shore A, as measured in accordance with ASTM D2240 type A scale.

15. A method of making an angular selective light control sheet material as recited in claim 1, wherein said opaque material comprises an adhesive component.

16. A method of making an angular selective light control sheet material as recited in claim 1, wherein said opaque material comprises a dark or colored pigment, dye or ink.

17. A method of making an angular selective light control sheet material as recited in claim 1, wherein said opaque material comprises high refractive index particles.

18. A method of making an angular selective light control sheet material, comprising:
- providing a sheet of an optically transmissive and highly elastic material;
- providing a slitting blade;
- advancing the slitting blade into the optically transmissive and highly elastic material to a predetermined depth;
- moving the slitting blade relatively to the sheet of an optically transmissive and highly elastic material along a straight or curvilinear path which is parallel to a major surface of the sheet of an optically transmissive and highly elastic material so as to form a channel of a predetermined width in the optically transmissive and highly elastic material;
- removing the slitting blade from the optically transmissive and highly elastic material; and
- introducing an opaque material into the first channel.

19. A method of making an angular selective light control sheet material, comprising:
- providing a sheet of an optically transmissive and highly elastic material;
- providing a plurality of slitting blades;
- advancing the plurality of slitting blades into the optically transmissive and highly elastic material to a predetermined depth;
- moving the plurality of slitting blades relatively to the optically transmissive and highly elastic material parallel to a major surface of the sheet of an optically transmissive and highly elastic material so as to form a plurality of parallel channels of a predetermined width; and
- introducing an opaque material into at least one of the plurality of parallel channels.

20. A method of making an angular selective light control sheet material as recited in claim 19, wherein the plurality of slitting blades comprises a pack of rotary blades assembled on a common axis with a predetermined spacing between tips of the rotary blades.

* * * * *